United States Patent [19]

Omori

[11] Patent Number: 4,645,125
[45] Date of Patent: Feb. 24, 1987

[54] HEAT TRANSPORT METHOD

[75] Inventor: Toshiaki Omori, Yachiyo, Japan

[73] Assignee: Tokyo Gas Company Limited, Japan

[21] Appl. No.: 708,263

[22] Filed: Mar. 5, 1985

[30] Foreign Application Priority Data

Mar. 6, 1984 [JP] Japan .................................. 59-42748

[51] Int. Cl.⁴ .......................... F24D 1/00; F24C 13/00
[52] U.S. Cl. .......................................... 237/12; 126/5;
126/381; 126/380; 237/9 R
[58] Field of Search .................... 126/5, 380, 381, 382;
237/1 R, 6, 12, 58, 67, 64, 66, 81, 60, 68, 59, 9
R; 165/1; 4/545

[56] References Cited

U.S. PATENT DOCUMENTS

| | | | |
|---|---|---|---|
| 1,581,591 | 4/1926 | Moreau | 237/64 |
| 2,068,549 | 1/1937 | Knight | 237/67 |
| 2,075,471 | 3/1937 | Sahloff | 4/545 |
| 2,167,336 | 7/1939 | McKeown | 237/67 |
| 2,297,071 | 9/1942 | Prentice | 237/67 |
| 2,378,760 | 6/1945 | Ferguson | 237/68 X |
| 3,210,005 | 10/1965 | Arnold | 237/67 X |
| 3,372,871 | 3/1968 | Pfluger | 237/64 X |
| 3,520,474 | 7/1970 | Pfluger et al. | 237/64 |
| 3,793,654 | 2/1974 | Roberts | 4/545 |
| 4,345,715 | 8/1982 | Van Craenenbroeck | 237/66 |

Primary Examiner—Larry Jones
Attorney, Agent, or Firm—McGlew and Tuttle

[57] ABSTRACT

A transport mechanism for heat in housing includes the use of liquid media such as warm water and gaseous media such as heated air. For either of these heat transport media, a circulation pump or a blower is necessary with the exception of special cases. This invention relates to a heat transport method where the heat media is evaporated by a steam generator which is fed up to an objective heat emitting device through steam tubes. At this heat emitting device, the steam is condensed for utilization of the latent heat being obtained by this condensation to space heating, water heating and so on. Further, the condensed heat media liquid is once stored in a condensed liquid vessel which is under atmospheric pressure, and the heat media liquid inside the condensed liquid vessel is circulated into the steam generator via steam tubes by stopping the heating of the steam generator and utilizing the pressure reduction being caused inside the steam generator. This intermittent movement is repeated so that, upon completion of a circulation cycle, the steam generator is heated.

9 Claims, 29 Drawing Figures

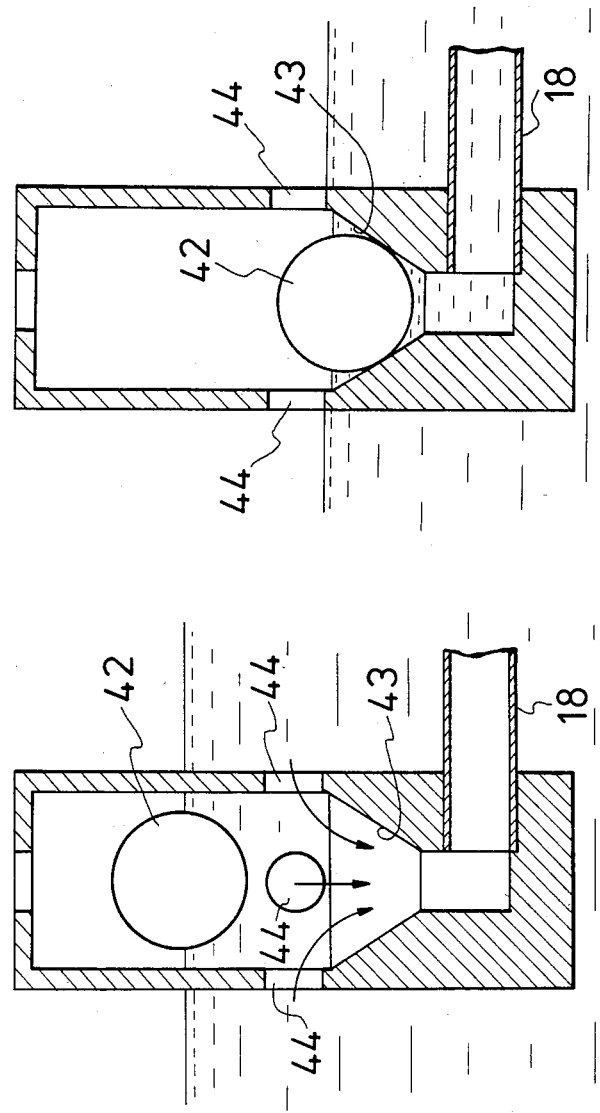

HEAT TRANSPORT METHOD

FIELD AND BACKGROUND OF THE INVENTION

This invention relates to heat transport methods for housing.

In the area of housing, it is widely known to use a boiler, for instance, one which is installed outdoors, to supply hot water to various radiators, hot water supply taps, bathtubs, and the like. This type of heating is widely known.

FIG. 1 indicates the system diagram of this central heating system, which is of the forced circulation type, where the water is heated within the boiler 01, and the heated water is supplied to a space heater 03, a hot water tap 04, a bathtub 05 and so forth from the feed pipes 02, by utilizing a circulation pump 07, and in case of a space heater 03 or a bathtub 05 equipped with bath heater 06. The cooled warm water is returned to the boiler via a return pipe and then reheated and sent out again.

Like the above system, the conventional central heating system always requires the presence of a circulation pump 07, and the control and maintenance of this circulation pump 17 poses a problem in terms of maintenance service. Moreover, because much power is consumed with resultant noise generation from operating the circulation pump 07, especially in houses, the demand for energy saving and countermoves against noise pollution is imminent.

There are heat transport means which do not have a circulation pump, such as a heat pipe system or a gravity circulation system. In the heat pipe, however, costs are extremely high and such a system has a number of work execution limitations and presents difficulty as to its application to housing. On the other hand, the gravity circulation system is the method where, as shown in FIG. 2, steam generated in a steam generator 1 is sent to the heat emitting coil 5 inside the heat emitting section 4 through the steam pipe 3, and the condensed liquid which has been deprived of the steam latent heat and condensed, is fed back to the steam generator 1 via liquid feedback pipe 12. In this gravity circulation system, however, the liquid level of condensed fluid inside the liquid circulation pipe becomes higher than the liquid level in steam generator 1 by the pressure loss portion H of the pipe channel and further there is a restriction that the heat emitting portion 4 must be installed above the liquid circulation pipe 12, and because it is impossible to give a larger value for H in view of the building construction, this system is not suited to the accommodations of modern housing which are becoming increasingly smaller since it is also difficult to use a larger resistant heat emitting section 1 (heat emitting coil 5) or a smaller diameter steam pipe 3.

Furthermore, just like the example shown in FIG. 2, another steam heating device is also known publicly where steam generated by the steam generator is utilized for heating, and the condensed heat media liquid is stored in a tank and fed into the steam generator again by utilizing a pump, but even in this case, a pump is put in use, so trouble relating to the pump still happens just like the case shown in FIG. 1.

Moreover, in the event of using liquid such as hot water as the heat media as it is, the pressure loss in transportation and at the heat emitting section becomes greater, so that flow channel diameter within the pipe channel and heat emitting section becomes unavoidably greater. There is also a demerit for the circulation pump to be enlarged because a stronger circulation pump must be selected.

SUMMARY OF THE INVENTION

The first objective of this invention exists in proposing a means of circulating the working heat media liquid into the steam generator without utilizing a circulating pump. The second purpose is to propose a heat transport method which is capable of improving the structure for the pipe channel or heat emitting section by making pressure losses therein larger.

BRIEF DESCRIPTION OF THE DRAWINGS

In the drawings:

FIG. 6 shows a gas buffer tank system condensed liquid vessel;

FIGS. 13, 14 and 15 illustrate examples of float type check valves;

FIGS. 23 and 24 show examples where a bag has been provided inside a condensed liquid vessel, in which FIG. 23 indicates that this bag is in a shrunk state while FIG. 24 shows that this bag is in a swollen state;

DESCRIPTION OF THE PREFERRED EMBODIMENTS

Figure 1:
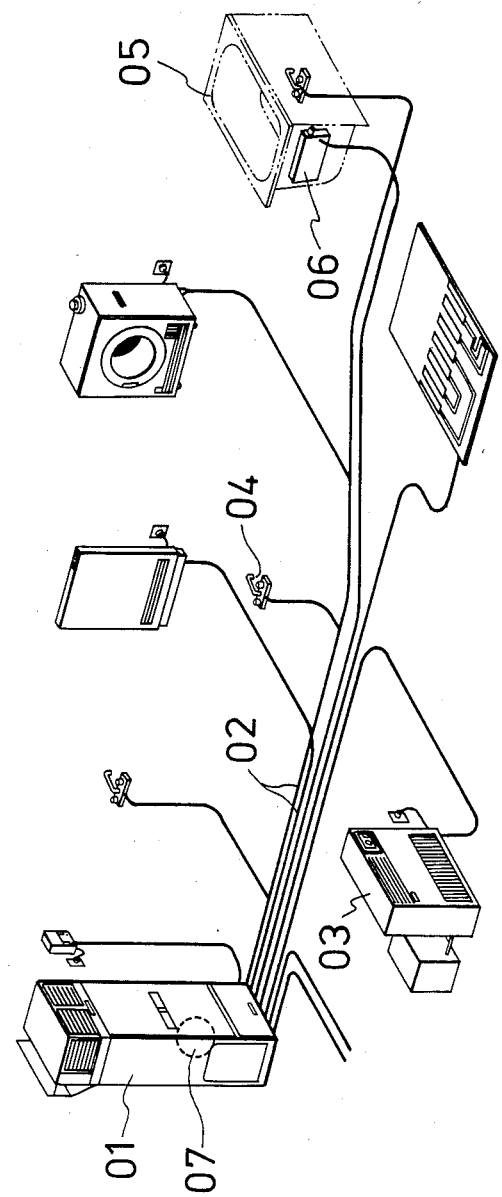
FIG. 1 is an explanatory drawing of a conventional central heating system.
Figure 2:
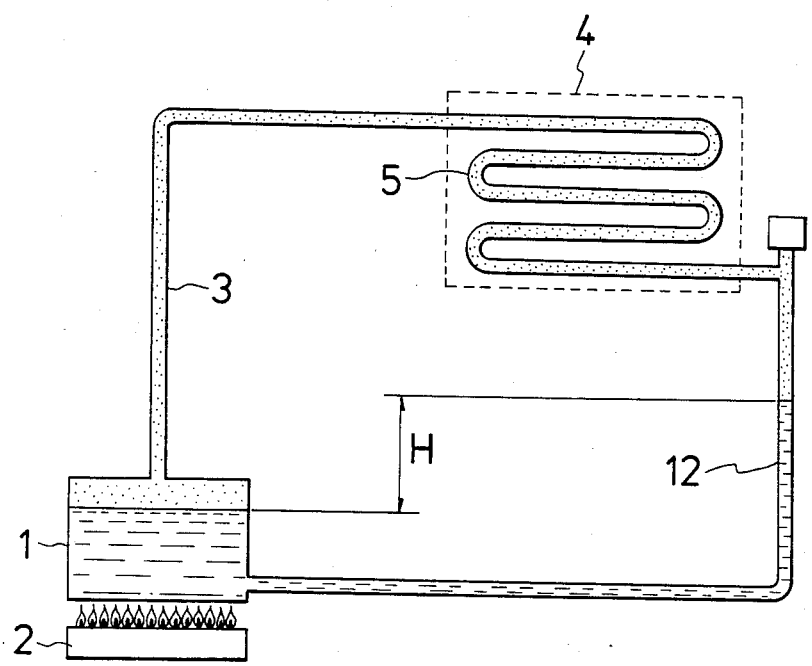
FIG. 2 is an explanatory drawing of a conventional gravity type steam heating system.

As a technical means of achieving the aforementioned purposes, this invention functions to generate saturated steam under pressure by the steam generator having a heating source, with which pressure the saturated steam is sent to the heat emitting section provided at a space heater, a hot storage water heater, a bathtub, etc. via pipe channels, and at the same time the condensed liquid deprived of its latent heat and condensed inside the heat emitting section is once stored inside the liquid storage vessel. When the liquid inside the steam generator has been reduced to a given level due to evaporation, the aforementioned heating source is turned off to stop the generation of steam, and then the condensed liquid stored inside the storage vessel is fed back to the steam generator by utilizing the vacuum action based on the cooling within the steam generator until a given volume has been fed back. The heating source is turned on again for starting the generation of heat, thus the heat caused by the heat generating section is to be transported up to the heat emitting section by repeating the aforesaid operations.

In other words, the features of this invention exist in saturating and evaporating the heat media at the heat generating section, feeding out the saturated steam up to the heat emitting section by utilizing the pressure rising action being entailed by this evaporation, storing the condensed heat media once inside the liquid storage vessel under atmospheric pressure, which has been deprived of latent heat and condensed at the heat emitting section, stopping the saturation and evaporation when the heat media on the side of the heat generating section has been reduced, feeding back to the heat emitting section, the heat transfer media which has previously been stored inside the vessel by utilizing the vacuuming action following the stopping of this saturation and evaporation, and further saturating and evaporating media to send it out to the heat generating section again when the feed-back has been completed. The invention thus uses an intermittent transport system for heat where a conventional circulation pump, as heat transport means, is unnecessary since the heat media is evaporated and the heat is transported up to the heat emitting section under this steam pressure. Moreover, because the vacuuming action is utilized as the means of feeding the condensed and liquefied heat media back to the steam generating section, a circulation pump for feeding the liquid back is not needed even for this.

Further as this invention serves to evaporate and send out the heat media as earlier mentioned, the pressure loss within the pipe channel and heat emitting tube can be made larger. Since the vacuuming action is utilized for feeding back the condensed and liquefied heat media, the heat media accumulated inside the vessel can be fed back up to the heat generating section through the heat emitting tube and the pipe channel where the pressure loss has been taken to a larger value as aforesaid.

From the above-mentioned features, the effect of heat transport means requiring no circulation pump and of heat transport means capable of having a larger pressure loss can be provided, and this effect makes it possible to eliminate the trouble involved with circulation pumps and to achieve an energy savings and a more compact heat transport means.

Hereinafter, a practical example relating to this invention is to be expounded on the basis of FIG. 3.

Figure 3:
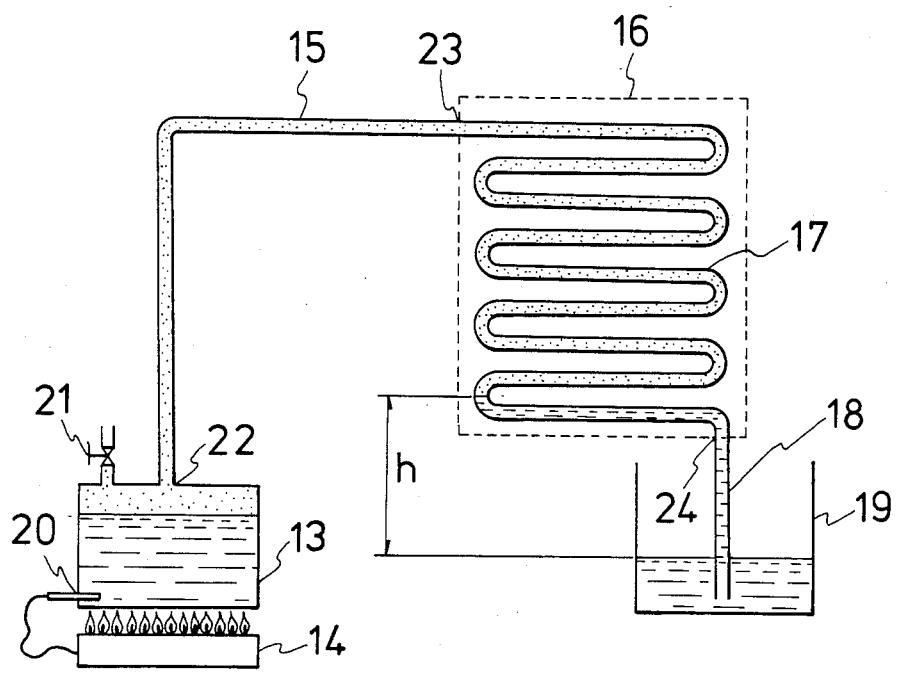
FIG. 3 illustrates a practical example of heating equipment having a heat transport method relating to this invention.

In FIG. 3, there is a steam generator 13 which is equipped with a low liquid level detection sensor 20 and a closing valve 21. The generator is further provided with a heating source 14 utilizing gas. The aforesaid structure represents the heat generating section.

The heat emitting section 16 incorporates a heat emitting coil (tube) 17. The inlet 23 of this heat emitting coil 17 is coupled with the steam outlet 22 which is provided on the top of steam generator 13 via the steam pipe 15 which is outwardly heat-insulated. An outlet 24 of coil 17 is connected to the condensed liquid pipe 18. The other end of said condensed liquid pipe 18 is inserted into the liquid inside the condensed liquid vessel 19 whose upper part is open to the atmosphere.

Next, the function of this practical example is to be discussed below.

In operating this equipment, the liquid phase heat media is necessary at the quantity in excess of the gross volume of steam generator 13, steam pipe 15, heat emitting coil 17 and condensed liquid pipe 18 that are shown in FIG. 3. When putting this equipment into operation for the first time, the closing valve 21 attached to the upper part of steam generator 13 in FIG. 3, is first opened. After the liquid phase heat media at optional volume has been poured into the steam generator 13 over valve 21, the valve is closed. Any remnant volume of liquid is poured into the condensed liquid vessel 19. After that, the heating source is turned on and then the liquid phase heat media in steam generator 13 becomes saturated steam while any stagnant air inside steam generator 13, steam pipe 15 and heat emitting coil 17 is released into the atmosphere from the condensed liquid vessel 19. When the heating source 14 is turned off, the wall of steam generator 13 is cooled down to cause the internal steam to be condensed with resultant appearance of a vacuum, while the liquid phase media in the condensed liquid vessel 19 is then fed into the steam generator 13 via heat emitting coil 17 over steam pipe 15.

When the heating source 14 is switched on under ordinary operation condition, the liquid phase heat media sealed inside steam generator 13 is heated up to generate saturated steam, which causes the liquid phase heat media inside steam pipe 15 and heat emitting coil 17 to be discharged into the condensed liquid vessel 19. Under the situation that the condensation proceeds gradually in heat emitting coil 17 while giving up heat to its surroundings and the inside of heat emitting coil 17 and the condensed liquid pipe 18 are filled with condensed liquid, the condensed liquid is discharged into the condensed liquid vessel 19. The condensed liquid within heat emitting coil 17 falls in temperature by giving a part of its sensible heat to the surrounding fluid.

The pressure Ps of saturated steam inside steam generator 13 will rise to the gauge pressure as given below by supposing the pressure loss of steam inside steam pipe 15 as Pv, the pressure loss of steam inside heat emitting coil 17 as Ph, the distance from the condensed liquid surface inside heat emitting coil 17 as h (with the upper side of the vertical line in FIG. 3 at h being the plus direction), the atmospheric pressure as Pa and the specific gravity weight of condensed liquid as $\gamma$:

$$Ps - Pa = Pv + Ph - (\gamma \cdot h)$$

It is noted that the surface between the condensed liquid and the steam inside heat emitting coil 17 becomes a negative pressure.

When the liquid level inside steam generator 13 has gone down and the low liquid level state is detected by the low liquid level sensor 20, the heating source 14 is switched off. The internal steam is condensed to cause a vacuum condition since the walls of steam generator 13 are cooled. While the condensed liquid in pipe 18, heat emitting coil 17 and steam pipe 15 is then pulled back to generator 13, because of the atmospheric pressure imposed on the surface of condensed liquid vessel 19. When the heating source 14 is switched on again, the saturated steam repeats the aforesaid process and the steam is sent out to the heat emitting coil 17 and is utilized for heating up the surrounding fluid (that is the coil surroundings) by means of heat emitting section 16.

In this practical example, the pressure of saturated steam being generated inside steam generator 13 rises to the value sufficient for discharging its liquid into condensed liquid vessel 19 during the initial heating-up period while the steam pipe 15 and the heat emitting coil 17 are filled with the liquid, and further at the time of transporting the steam, and since the pressure is built up according to the pressure low which is being caused when the steam passes through steam pipe 15 and heat emitting coil 17, the heat emitting device of any dimensions and profile can be installed at any location and further there is another merit that the pipe diameter of steam pipe 15 can be made smaller. The generation of steam and the liquid feed mode of condensed liquid to steam generator 13 can be changed over only by turning on or off the heating source 14. There is an additional merit in that the transport pipe can be used commonly and can offer a simplified structure, thus reducing piping installation costs.

A second practical example of this invention is to be introduced thereafter.

Figure 4:
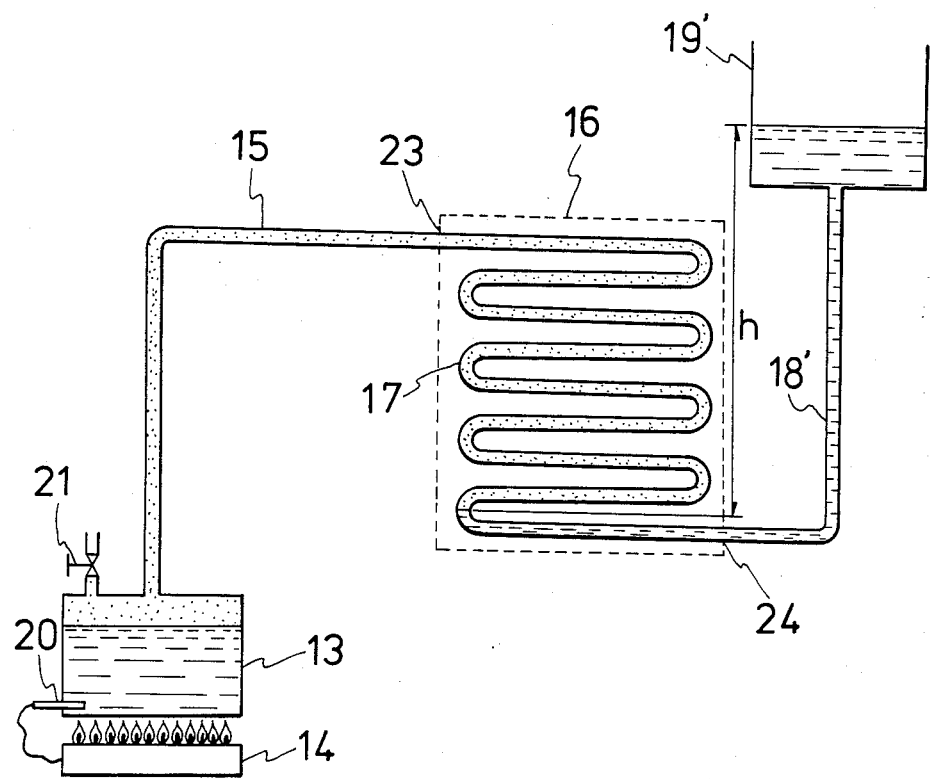
FIG. 4 illustrates a practical example of heating equipment which used the method of this invention where the condensed liquid tank has been arranged at a higher level than the heat emitting section.

In FIG. 4, 19' is the condensed liquid vessel provided on the top of the equipment, while the lower part of this condensed liquid vessel 19' is connected to the heat emitting coil 17 via the condensed liquid pipe 18' with the surface of condensed liquid opening to the atmosphere. Other reference numerals denote the same structures as in FIG. 3.

The function of this example is to be explained now.

When operating this equipment for the first time, the liquid phase heat media at the volume mentioned in the first example shall first be poured entirely into the condensed liquid vessel 19'. Then the closing valve 21 installed at the upper part of steam generator 13 is opened and when a small volume of liquid has been discharged to the exterior through the closing valve 21, valve 21 is closed, thus the air which is stagnant inside the lines can be exhausted.

Though as regards the ordinary operation function, quite the same as the first practical example is applied in this case. The identical relation of $Ps - Pa = Pv + Ph - \gamma \cdot h$ as in the first example is applicable to the saturated steam pressure Ps being generated by steam generator 13 of the distance h from the condensed liquid surface inside condensed liquid vessel 19' up to the condensed liquid face inside heat emitting coil 17 and measured as the upper part of a vertical line taken as the positive value, whereby the saturated steam having the gauge pressure of Ps-Pa is built up.

In the second practical example, the surface between condensed liquid and steam inside heat emitting coil 17 is maintained at positive pressure.

Figure 5:
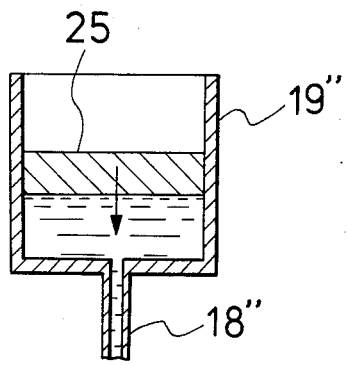
FIGS. 5 and 6 show an example of condensed liquid tanks, where FIG. 5 indicates a cylindrical condensed liquid vessel.

In FIG. 5, 19'' stands for a cylinder-shaped condensed liquid vessel, which incorporates a piston 25. The piston 25 has been designed to move smoothly in the vertical direction inside the cylinder shaped condensed liquid vessel 19''. The lower part of condensed liquid vessel 19'' is connected to the heat emitting coil 17 through the condensed liquid pipe 18''. The rest of the system, not shown in FIG. 5, is the same as in FIG. 4.

In this example, the ordinary function quite equals that of the 1st and 2nd practical examples. Taking the weight of the piston as G and the sectional area as A however, the pressure Ps of saturated steam being generated by steam generator 13 can be expressed by the formula of $Ps - Pa = Pv + Ph + G/A - \gamma \cdot h$, which means the increase of generated pressure by G/A. Since it is here possible to shut off the contact of the heat media from the atmosphere, the equipment can be protected from corrosion attributable to air, thus its durability can be upgraded.

Next, the 4th practical example of this invention is to be discussed below.

Figure 6:
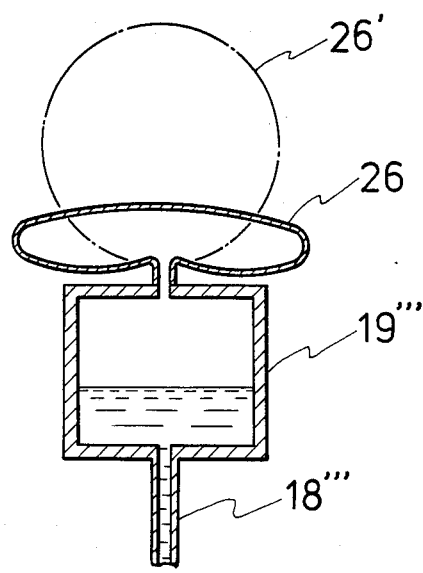

In FIG. 6, 19''' is the condensed liquid vessel, the top of which is equipped with a flexible and expandable buffer tank or bladder 26 for gas containment and the lower part of which is coupled with the condensed liquid pipe 18'''.

After the air that is stagnant inside the equipment has been eliminated, an inactive or inert gas such as nitrogen is to be introduced into the space between condensed liquid vessel 19''' and buffer tank 26.

In the event of the aforesaid 4th practical example, the ordinary function is quite similar to those of the 1st and 2nd practical examples, but there is a merit that the contact of heat media with the atmosphere can be prevented while keeping the pressure being imposed on the surface of condensed liquid approximately at atmospheric pressure by feeding into the buffer tank 26 the sealed gas which corresponds to the incremental volume of condensed liquid within the condensed liquid vessel 19'''. The buffer bladder's inflated position is shown at 26'.

Figure 23:
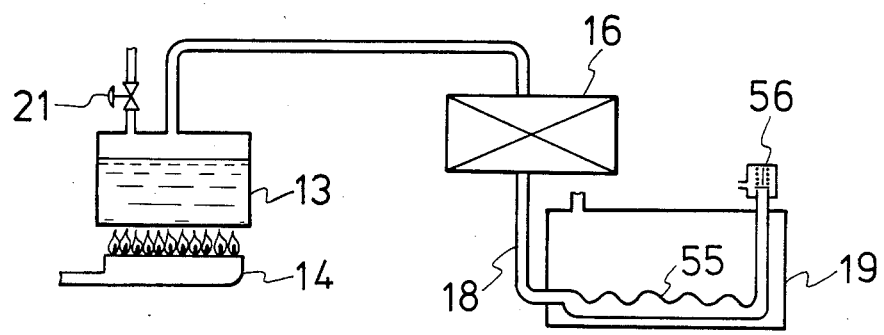
Figure 24:
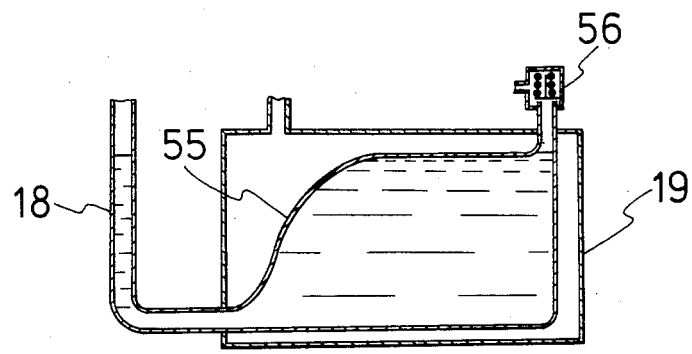
Figure 25:
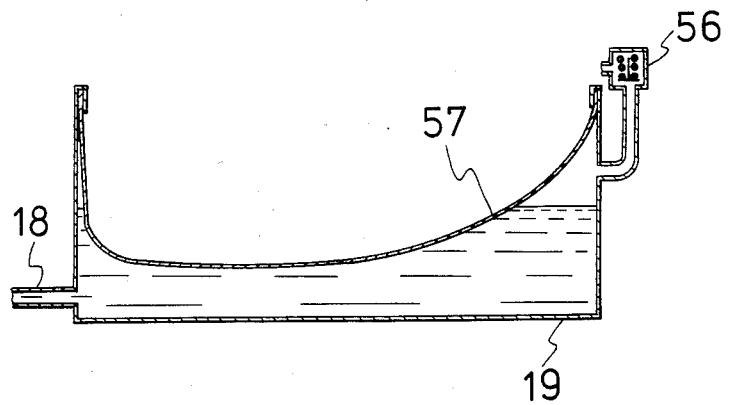
FIG. 25 shows an example where a cover has been fitted to the condensed liquid vessel.
Figure 26:
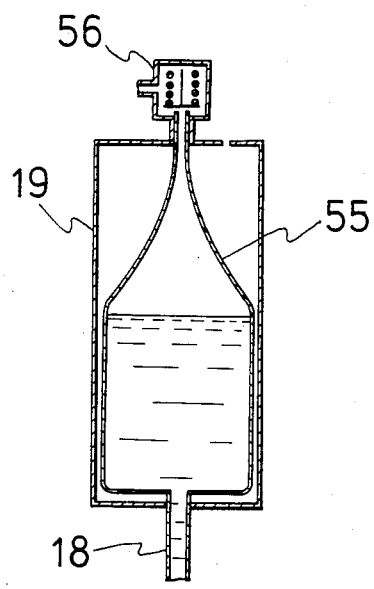
FIG. 26 illustrates an example where nitrogen gas has been sealed in the bag contained inside the condensed liquid vessel.
Figure 27:
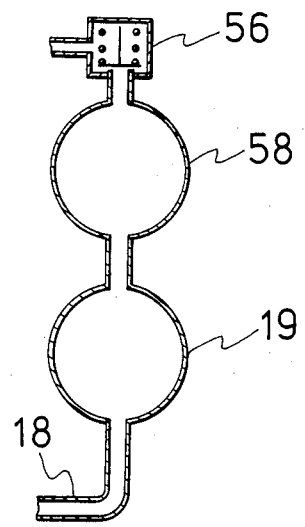
FIG. 27 illustrates an example where the nitrogen gas container has been installed on the top of a condensed liquid vessel.

FIG. 23 through FIG. 29 show the other types of practical examples of condensed liquid vessel 19, where the condensed liquid is prevented from being exposed directly to the atmosphere. Namely, in the case of FIG. 23, the condensed liquid can be contained in a sheet-shaped bag that can be expanded or shrunk, where when the bag is filled with liquid it expands as shown in FIG. 24 and when the bag is short of filled with liquid it shrinks as shown in FIG. 23. Air check valve 56 which interconnects the interior of bag 55 with the atmosphere, and when the air entering from the coupling areas should exceed a certain level, the air being accumulated in the upper space of condensed liquid vessel 19 will be exhausted to the outside from the air valve 56 due to the pressure rise inside. FIG. 25 is the example where a sheet-shaped cover 57 is attached to the condensed liquid vessel 19, and the interior of this cover 57 is interconnected with the atmosphere through air check valve 56. FIG. 26 indicates the practical example where nitrogen gas has been sealed inside the bag 55 which is introduced in FIG. 23. FIG. 27 indicates the practical execution example in which a nitrogen gas container 58 is provided apart from the condensed liquid vessel 19, where since the entirety of the line is filled with nitrogen because of the action of nitrogen gas when the steam evaporator 13 has been stopped, the condensed liquid isn't frozen even if the ambient temperature has gone down even to the freezing temperature level.

Figure 28:
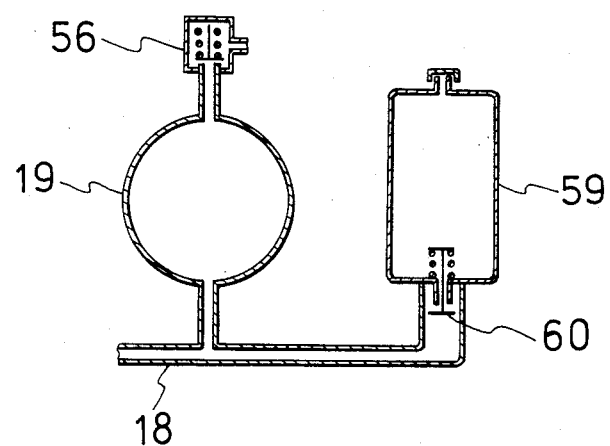
FIGS. 28 and 29 show examples of the invention where a water replenishing tank has been mounted to the condensed liquid vessel.
Figure 29:
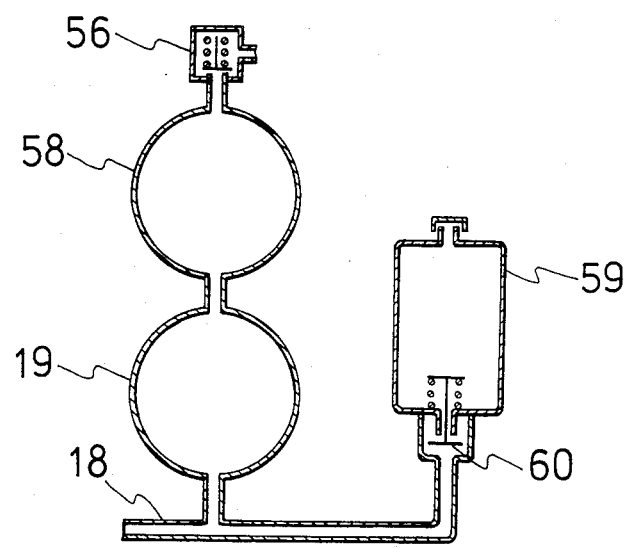

FIG. 28 and FIG. 29 represent the practical examples where, apart from the condensed liquid vessel 19, the water replenishing tank 59 and the control valve 60 have been provided in order to replenish water in the event that the condensation liquid (heat media liquid) is reduced.

Figure 7:
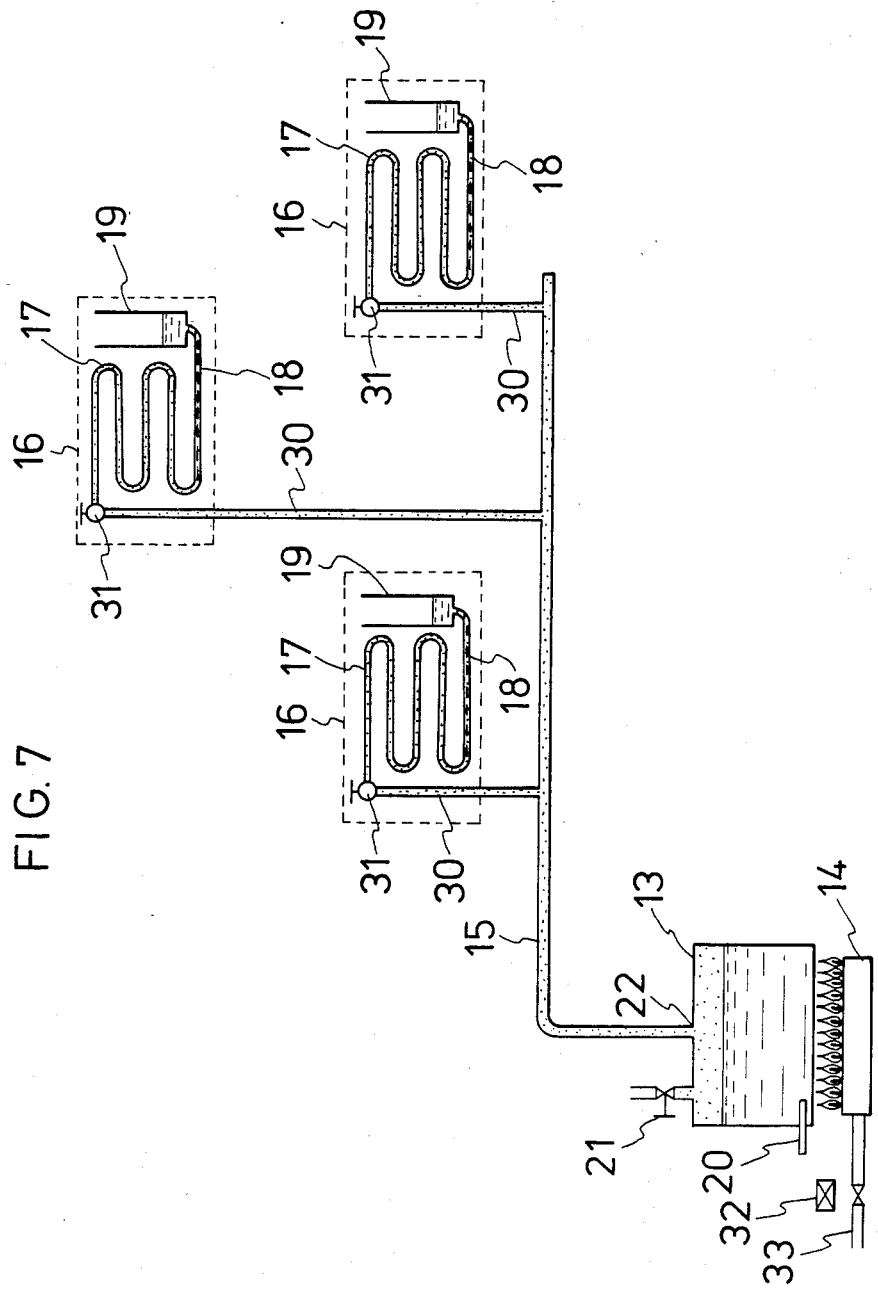
FIG. 7 shows an example of this invention which incorporates a plural number of heat emitting sections.

FIG. 7 shows the case where this invention has been applied to the example where the heat emitting section consists of a plural number of units, namely of three units, and the condensed liquid vessel 19 is built into the heat emitting sections 16 respectively. The action of the heat media is the same as the example given in FIG. 3. In FIG. 7, 30 stands for the branched steam pipe leading from steam pipe 15 upto respective heat emitting sections 16, 31 is the operation valve fitted to respective heat emitting sections 16 while 32 is the gas control valve and 33 indicates the gas supply pipe.

Figure 8:
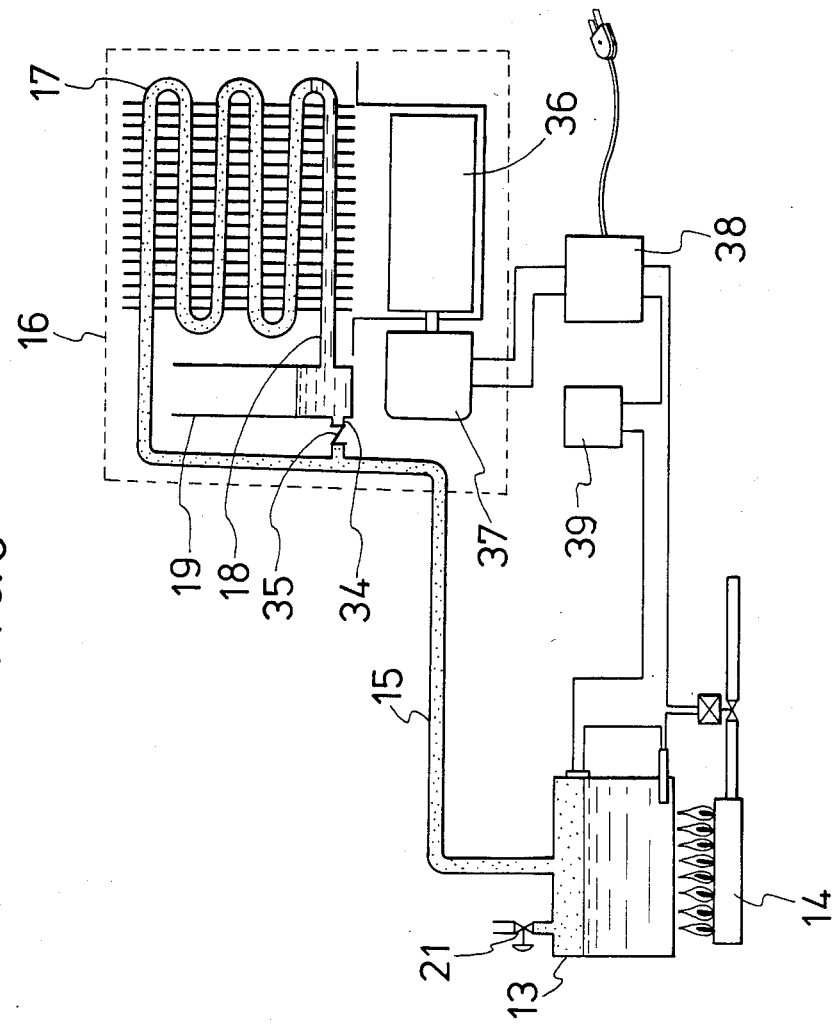
FIG. 8 is a diagram of an example of the invention where a by-pass pipe equipped with check valve has been installed inside the steam pipe and the condensed liquid vessel.

FIG. 8 illustrates an example where a by-pass pipe 34 for by-passing the heat emitting coil 17 has been installed between the condensed liquid vessel 19 and the steam pipe 15, and at the same time a check valve for releasing it only to the steam pipe 15 from the condensed liquid vessel has been installed in this by-pass pipe 34. According to this practical example, the condensed liquid inside condensed liquid vessel 19 is fed back to the steam generator 13 without passing through the heat emitting coil 17. As a result, not only the pressure loss can be alleviated at time of circulation but also the heat emitting coil 17 cannot be cooled down by the cooled condensed liquid. In FIG. 8, 36 is a fan, 37 a fan motor while 38 and 39 are controllers respectively.

Figure 9:
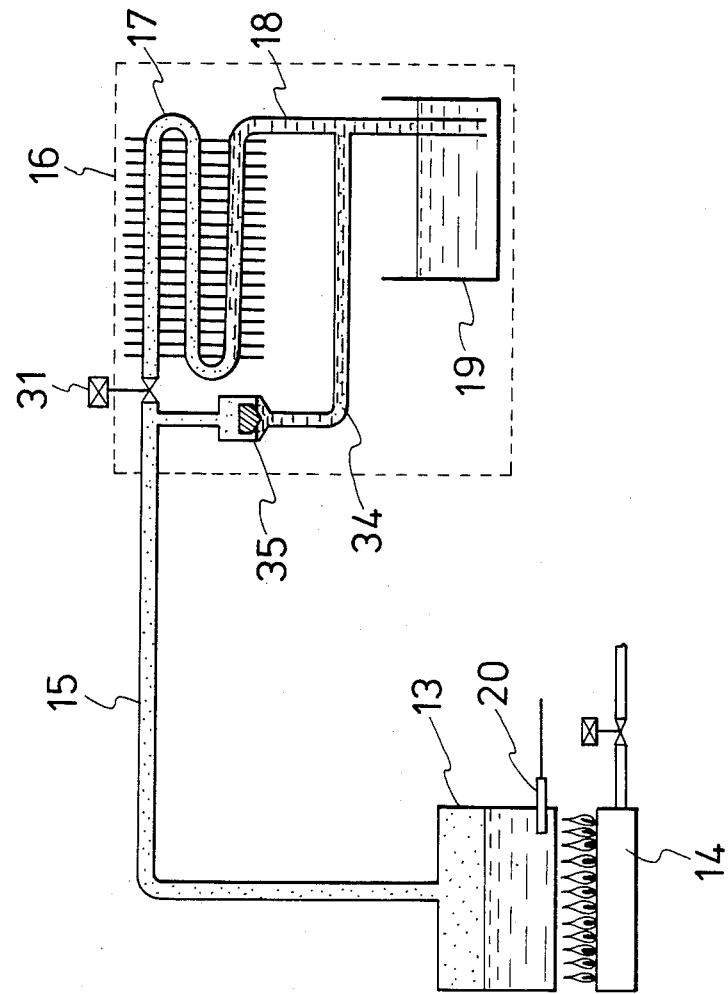
FIG. 9 illustrates an inventive example where the by-pass pipe equipped with check valve has been installed between the steam pipe and the condensed liquid pipe.
Figure 10:
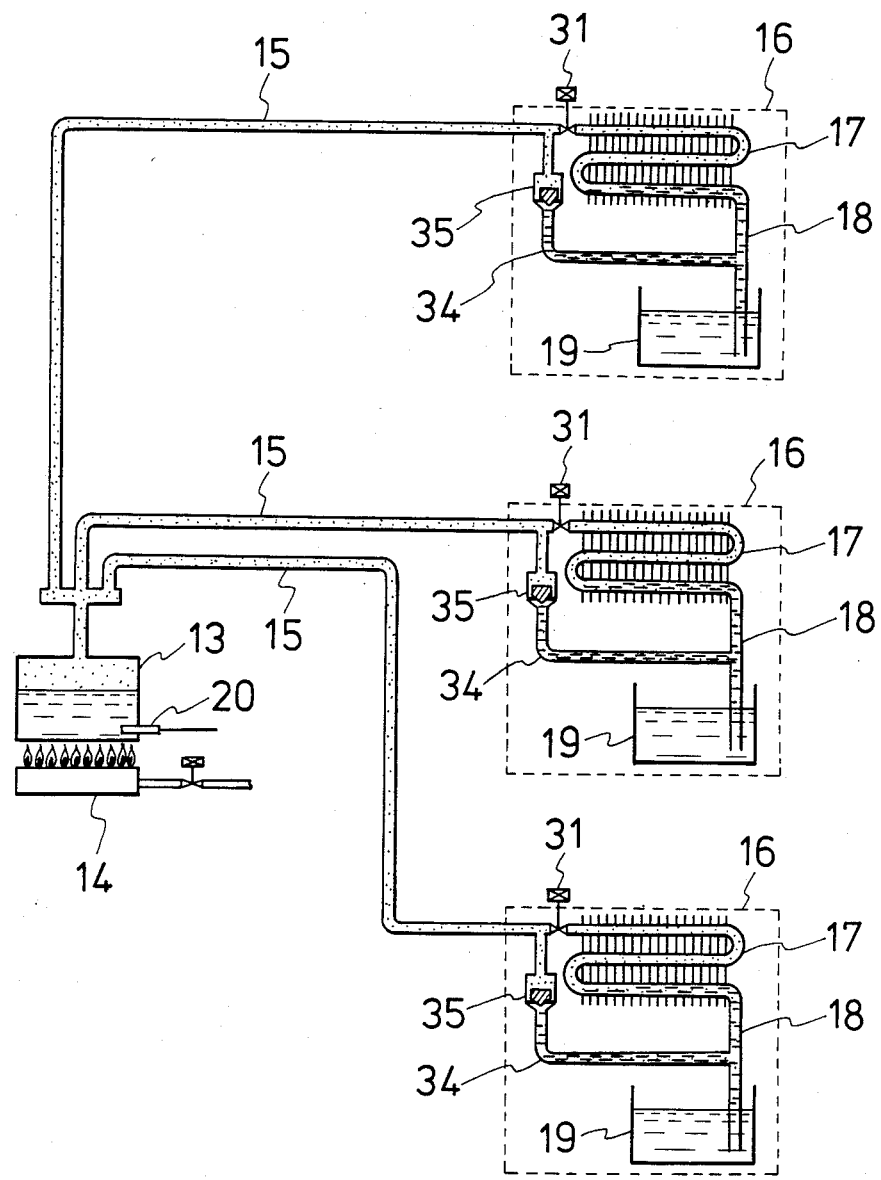
FIG. 10 shows an inventive example for operating a plural number of heat emitting sections.
Figure 11:
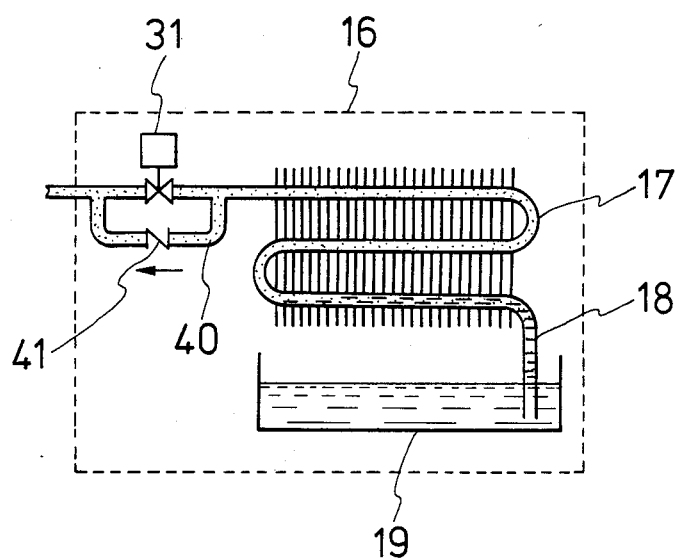
FIG. 11 shows an example where the by-pass pipe provided with check valve has been fitted to the operation valve of a heat emitting section.

FIG. 11 indicates the case where the operation valve is provided with a by-pass pipe 40 and further with a check valve 41 allowing the liquid to flow only to the side of steam generator 13, and FIG. 9 represents the version where the other end of by-pass pipe 34 has been connected to the condensed liquid pipe 18. In an arrangement like this, if the operation valve is stoppped midway in the cycle and the other heat emitting section 16 is in operation while the heat emitting section 16 consists of a plural number of units, as shown in FIG. 10, the heat media which has once stayed stagnant can be circulated from the heat media liquid vessel 19 even during suspension of the operation.

Figure 12:
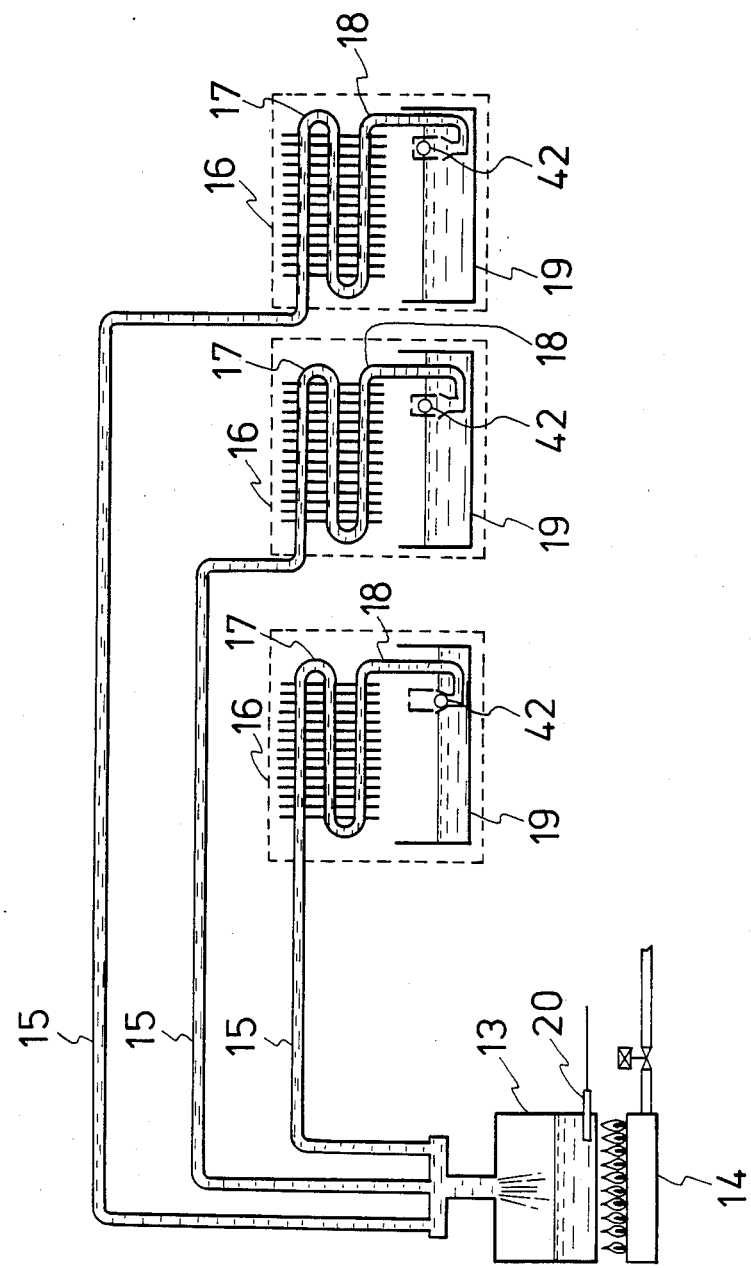
FIG. 12 shows an example where a float type check valve has been fitted to the tip of a condensed liquid pipe.
Figure 15:
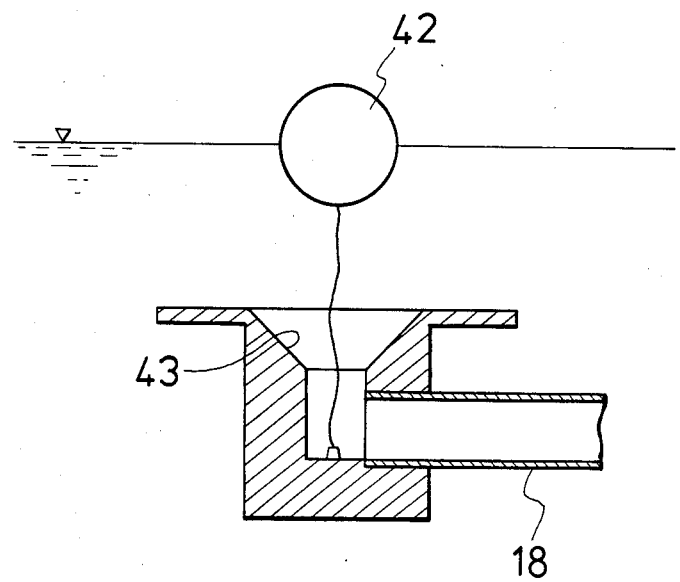

FIG. 12 represents one of the practical examples for operating a plural number of radiators 16, where a float type check valve 42 has been attached to the tip of condensed liquid pipe 18. This stands for the example where, in one unit out of several radiators, the condensed liquid can be fed back because of the provision of a float type check valve 42, and if the condensed liquid vessel 19 has been made empty, air is not sucked from the emptied vessel to ensure the liquid being circulated from the other heat emitting section 16 into the steam generator. FIGS. 13, 14 and 15 indicate the practical examples of float type check valve 42, where the float type valve 42 isolates from the valve seat 42 by its floating force while there is liquid, to allow for the liquid circulation, but when the liquid falls in level and the flow level becomes lower than the valve seat 43 or the flow inlet 44, and the valve adheres to the valve seat 43 and prevents an entry of air thereinto.

Figure 16:
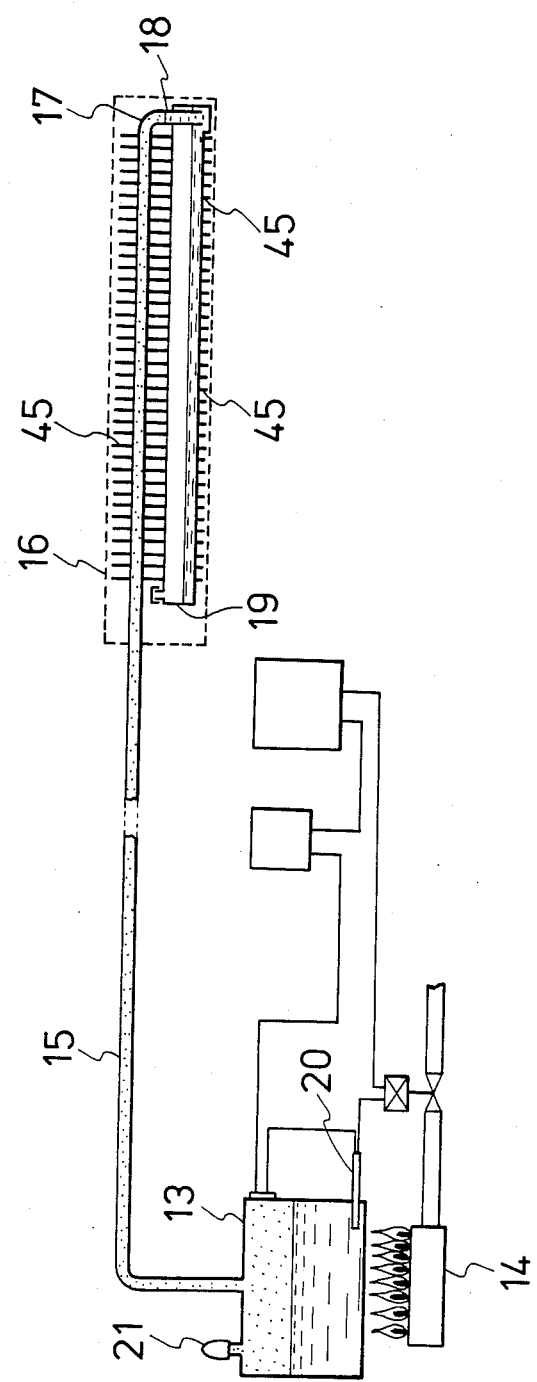
FIG. 16 shows an example of the heat emitting section which utilizes at the same time the latent heat of condensed liquid in a heat emitting section.

FIG. 16 indicates the example where even the sensible heat of condensed liquid is utilized in addition to the condensation latent heat, and heat transfer fins 45 are provided on the condensed liquid vessel 19 as well, in addition to the heat emitting coil 17.

Figure 17:
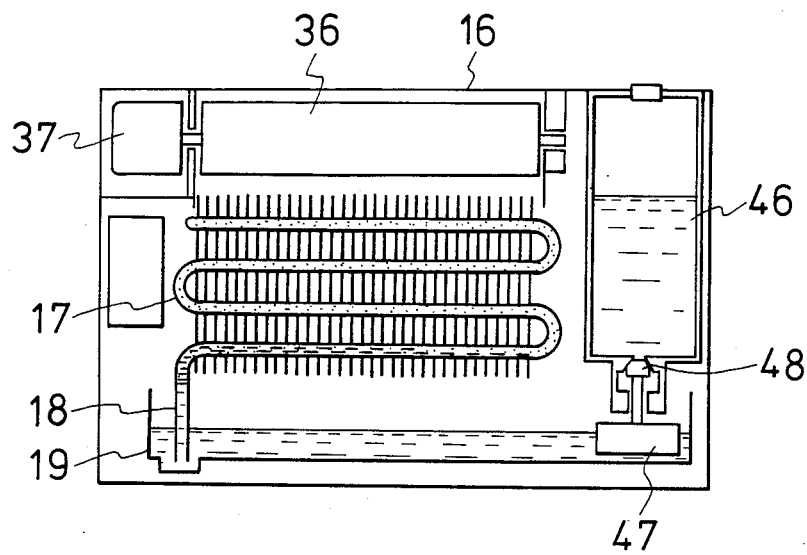
FIGS. 17 and 18 are illustrations of devices where a humidifying fuction has been added to the heat emitting section.
Figure 18:
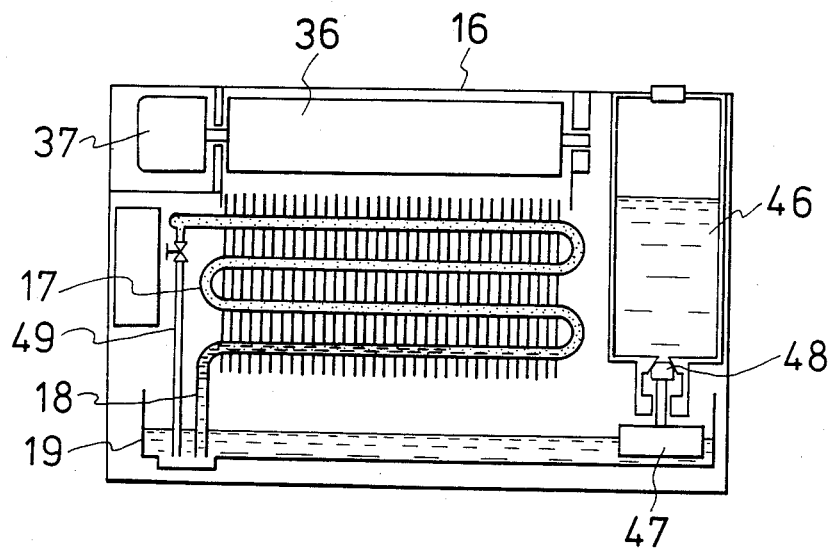

FIG. 17 and FIG. 18 are practical examples where a humidifying function is added to the heat emitting section, and serves to fill the water reservoir 46 with water by installing the water reservoir 46 apart from the condensed liquid vessel 19. This serves to replenish this water reservoir 46 the reduced portion of water which has been evaporated from the condensed liquid vessel 19, and functions to open the condensed liquid vessel 19 and to cause humidification by utilizing the natural evaporation from this vessel. In FIG. 18, 49 represents the steam supply pipe where a part of the steam is fed into the condensed liquid vessel 19 and heats it up via the steam supply pipe 49 when heating up the liquid temperature inside the condensed liquid vessel 19.

Figure 19:
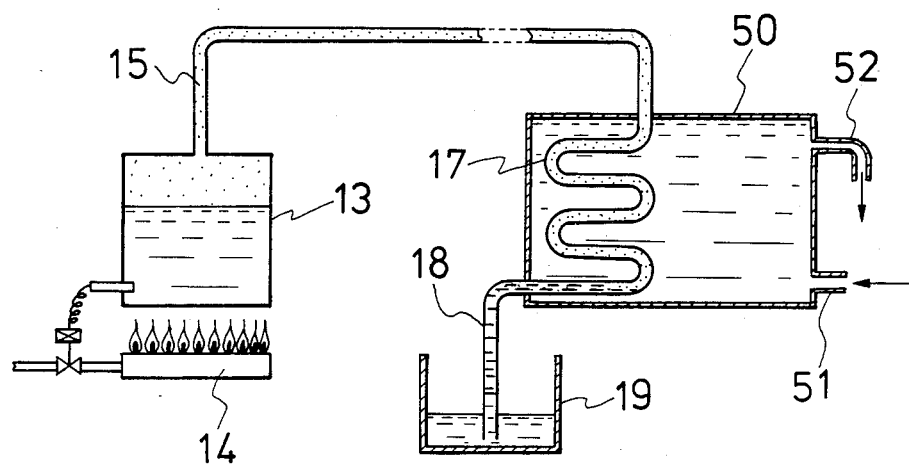
FIG. 19 shows an example where the present invention has been put into practical use for a hot water supply.

FIG. 19 indicates a practical example where a heat emitting coil 17 is inserted into the hot water supply tank 50 and the water filled within the hot water supply tank is given the condensed latent heat and thus is itself heated up. 51 is a water supply port while 52 is a hot water tap.

Figure 20:
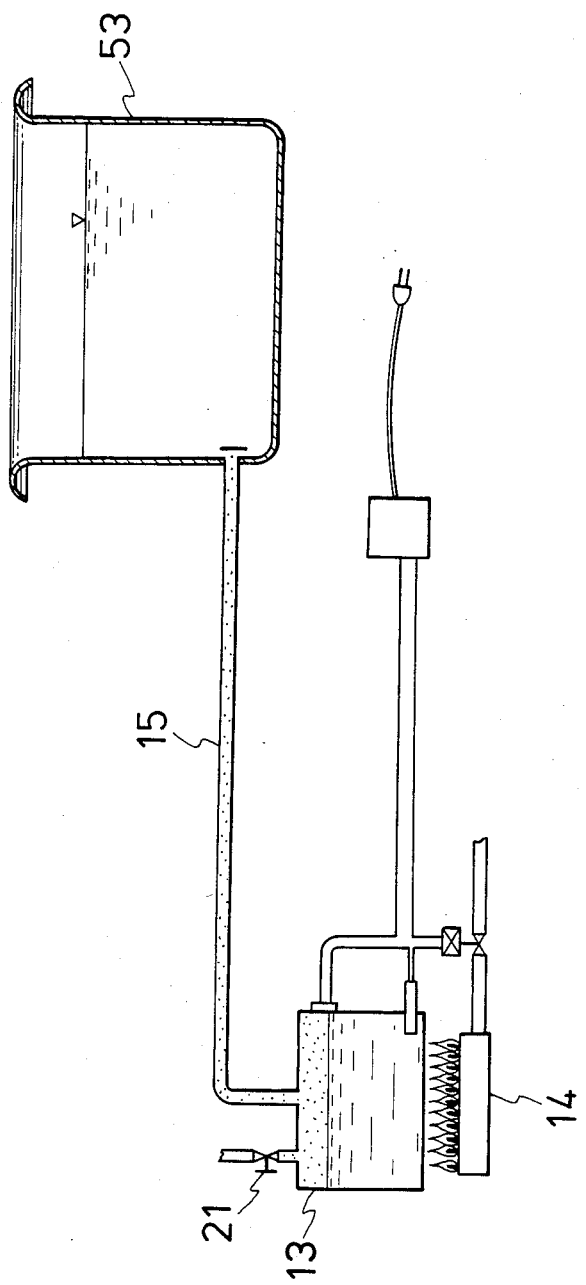
FIG. 20 shows an example where this invention has been put into practical use for heating up the water inside a bathtub.

FIG. 20 shows an example for feeding the steam directly into a bathtub 53 and for heating up the water within the bathtub 53, where the water within bathtub 53 is circulated into the steam generator 13 when the heat media liquid within steam generator 13 has been reduced to a certain low level and the heating has been stopped.

Figure 21:
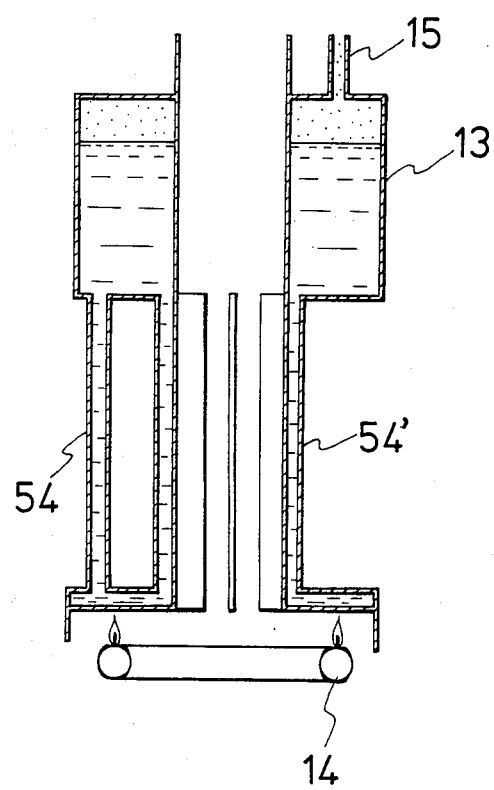
FIGS. 21 and 22 show examples where the heating section has been structured with a rainfall pipe and heat transfer pipe at the steam generator.
Figure 22:
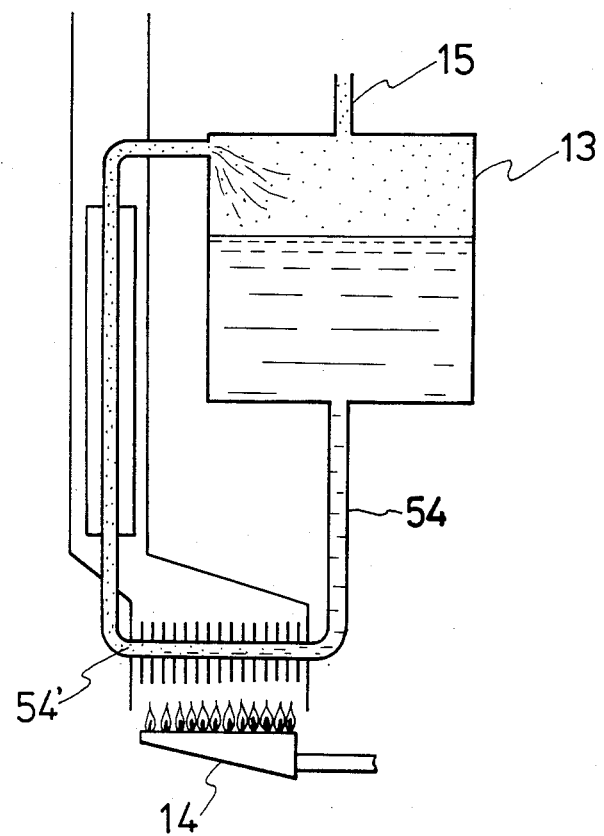

FIGS. 21 and 22 show the practical examples wherein the steam evaporator 13 can be used to generate steam even if the remnant water volume is scarce, or the version in which a rainfall pipe 54 has been isolated from the heat transfer pipe 54'. With structures like this, the heat transfer pipe 54' can be maintained in wet condition because the liquid phase heat media is supplied to the heat transfer pipe 54' due to the specific gravity difference of fluids inside both the pipes, and hence the steam can be generated stably while preventing the steam generator 13 from being overheated.

As mentioned above this invention eliminates the need for a circulation pump for feeding the liquid because the liquid can be circulated by the pressure difference between the interior of the steam generator and the condensed liquid vessel. Consequently, there appear no troubles of any kinds relating to the circulation pump.

Since the pressure of saturated steam being caused inside steam evaporator is formed up in accordance with the pressure loss being caused at the steam passage areas, the heat emitting section of whatever dimensions and whatever configurations can be installed at any locations, and the diameter of the steam pipe can be made smaller.

Moreover, as the air inside the equipment can be released to the atmosphere at the time of initial operation, the condensed liquid vessel can be installed at the lower part of the heat emitting section, thus offering a wider range of flexibility of designs, and at the same time it is possible to use the condensed liquid within condensed liquid vessel directly for hot water supply and for a bathtub.

In addition, the change-over between the generation of steam and the liquid feed into the steam generator for condensed heat media can be achieved only by turning the heat source on or off, and that, the transport pipe can be used commonly for both directions of flow, and hence the structure is simple to allow for reduction in piping installation cost, and consequently a cost-saved steam media heat utilization system can be constructed.

Further, this invention can be combined with a cylinder piston type condensed liquid vessel and a buffer tank equipped condensed liquid vessel, or with a enclosed type condensed liquid vessel, and in this event, the contact of heat media with air can be prevented and the durability of equipment can be enhanced.

What is claimed is:

1. A heating method for a house, comprising, adding a vaporizable liquid to a closed steam generator, activating a heating source for heating the steam generator to an extent to generate saturated steam in the steam generator, supplying the saturated steam from the top of the steam generator to at least one heat emitting section which is connected to the steam generator by a steam pipe, latent heat supplied to the heat emitting section by the saturated steam being lost to the surroundings for condensing the saturated steam in the heat emitting section into condensed liquid, supplying at least some of the condensed liquid to a condensed liquid vessel which is connected to the heat emitting section, continuing the activation of the heating source until a level of liquid in the steam generator has fallen to a selected level, deactivating the heating source when the level in the steam generator has fallen to the selected level, so that a partial vacuum is formed in the steam generator above the liquid level, exposing the condensed liquid vessel to a pressure so that with the partial vacuum in the steam generator, the condensed liquid from the condensed liquid vessel is drawn back to the steam generator over the heat emitting section and the steam pipe, after the steam generator has been filled to a selected volume which raises the selected level, reactivating the heating source to again heat the steam generator and the vaporizable liquid therein for generating saturated steam.

2. A method according to claim 1, including exposing the condensed liquid vessel to atmospheric pressure.

3. A method according to claim 2, wherein the at least one heat emitting section includes a heat emitting tube connected to the steam pipe with heat transfer fins attached to and surrounding the heat emitting tube.

4. A method according to claim 2, wherein the heat emitting section comprises a panel containing a heat emitting tube which is connected to the steam pipe.

5. A method according to claim 2, wherein the heat emitting section comprises a heater for heating the walls of a bathtub, the condensed liquid vessel comprising a bathtub for receiving condensed liquid from the heater.

6. A method according to claim 2, including covering a surface of condensed liquid in the condensed liquid vessel with a flexible bladder for isolating the condensed liquid from the atmosphere.

7. A method according to claim 2, including generating saturated steam in the generator so as to follow the formula:

$$Ps - Pa = Pv = Ph - (\gamma \cdot h)$$

wherein Ps is the pressure of saturated steam in the heater, Pa is atmosphere pressure, Pv is a pressure loss in a pipe connecting the steam generator to the heat emitting section, Ph is a pressure loss in the heat emitting section, $\gamma$ is the specific gravity of the vaporizable liquid and h is the difference in level between saturated liquid in the heat emitting section and liquid in the condensed liquid vessel.

8. A method according to claim 7, including supplying condensed liquid from the condensed liquid vessel over a by-pass line to the pipe connecting the steam generator to the heat emitting section and positioning a one-way check valve in the pipe which permits flow liquid only from the vessel to the pipe.

9. A method according to claim 7, including connecting the heat emitting section over a second pipe to the vessel and supplying liquid from the further pipe over a by-pass line to the first-mentioned pipe connecting emitter to the generator, and positioning a check valve in the by-pass line which only permits flow of liquid from the further pipe to the first mentioned pipe.

* * * * *